Patented June 10, 1952

2,600,263

UNITED STATES PATENT OFFICE 2,600,263

ARSENIC ACTIVATED ZINC SULFIDE PHOSPHOR AND METHOD FOR MAKING SAME

Jerome S. Prener, Schenectady, N. Y., assignor to General Electric Company, a corporation of New York No Drawing. Application January 24, 1951, Serial No. 207,649

8 Claims. (Cl. 252—301.6)

This invention relates to luminescent materials. More particularly, it relates to arsenic activated zinc sulfide phosphors which luminesce under cathode ray and ultraviolet excitation.

With the growing importance of television and other cathode ray tube applications there has been a corresponding demand for white light emitting luminescent materials. There is also a need for such phosphors in the fluorescent lighting field wherein ultraviolet energy is used as the exciting medium. Heretofore, most of such white light emitting phosphors have been prepared by mixing different materials, each having emission bands which when blended give a resultant white appearing emission.

It is an object of my invention to provide a luminescent material which emits white light under cathode ray and ultraviolet excitation.

Another object of my invention is to provide such a material in a single substance with no need for blending different materials.

A further object of my invention is to provide a white light emitting phosphor in which the shade of white light may be controlled by varying the amount of activator.

It has been found that such white light emitting phosphors may be provided by combining with zinc sulfide activating proportions of arsenic.

It is known that pure zinc sulfide, when fired in a protective atmosphere at about 1000° C. together with a small amount of fusible sodium chloride as a flux, has a blue emission when excited by cathode rays or ultraviolet radiation. This blue emission has variously been attributed to activation by interstitial zinc.

According to my invention when small amounts of arsenic are added to the zinc sulfide, besides the blue color, emission bands appear also in the orange and green portions of the spectrum, the resultant overall emission appearing white to the eye. Either the orange or green bands may be emphasized by varying the amount of arsenic.

In carrying out my invention, arsenic is added in the form of a compound such as arsenic trisulfide, arsenic trioxide, zinc arsenate or others in such amounts that the added arsenic content of the zinc sulfide-arsenic compound mixture is at least 0.01 per cent based on the weight of the zinc sulfide. The upper limit of arsenic addition is not strictly defined, amounts up to about five per cent having been used. However, at such high arsenic concentrations the emitted color is green rather than white. For practical purposes when a white color is desired, the arsenic content ranges from 0.01 per cent to 2.00 per cent of the starting material with the higher content having a slight tinge of green under cathode ray excitation. Under 3650 Å. ultraviolet excitation the emitted color ranges from a warm or orangish white at 0.01 per cent arsenic content to a light greenish white at 2 per cent arsenic addition.

In preparing the present phosphors or luminescent materials the zinc sulfide and arsenic compound are thoroughly mixed together, as by grinding, along with the usual amount of sodium chloride flux as is well known in the art. Generally the amount of flux ranges from about 2 per cent to 6 per cent of the mixture. While sodium chloride is preferred as a flux, other alkali and alkaline earth halides as well as other fluxes known in the art are also satisfactory, the flux itself being substantially removed from the material after firing and playing no role in the emitted color.

The phosphors of my invention are prepared in a protective hydrogen atmosphere and are fired at temperatures ranging from 800° C. to 1000° C. for about one-half hour. While the resultant phosphor is suitable for use, a more homogeneous product is obtained by cooling the phosphor, regrinding and refiring for about fifteen minutes at the same temperature. This product is then washed free of flux and dried.

Preferably the starting materials are fired at 900° C. for one-half hour, reground and refired at the same temperature for fifteen minutes, such treatment producing the whitest emission. In general, substantially higher temperatures than 900° C. produce a luminescent material which has an orangish or warm tinge in the white emission due to loss of arsenic. In a series of samples containing one per cent by weight arsenic and fired for one-half hour at 800° C., 900° C., 1000° C., and 1150° C., those fired at 800° C. and 900° C. had a white emission while at the higher temperatures an orangish white emission resulted.

The time of firing at any one temperature likewise affects the color of the final product through the loss of arsenic due to vaporization. In general, substantially longer firing times than one-half hour tend to shift the color of the emitted light towards the orange. This is consistent with the observation that samples containing more than 0.10 per cent by weight added arsenic have less orange in their emission when excited by 3650 Å. ultraviolet.

The exact amount of arsenic lost during the firing process is not known, no precise technique for determining the composition of the final product having been developed. However, a final luminescent material of consistent composition is obtained by starting with known materials which are treated in a uniform manner.

The following is indicative of the preferred procedure of making my new luminescent materials. Ten gram portions of pure zinc sulfide were mixed with five per cent (0.5 gram) by weight of sodium chloride and enough arsenic trisulfide to provide respectively 0.01 per cent, 0.10 per cent, 0.50 per cent, 1.00 per cent, and 2.00 per cent by weight of arsenic based on the weight of the zinc sulfide. Preferably the materials are mixed by grinding. The samples were then fired in hydrogen at 900° C. for one-half hour. As pointed out above, while the product of this first firing is suitable for use, a more homogeneous material results if the product is cooled, reground, refired at about 900° C. for about fifteen minutes, washed with hot distilled water to remove the flux and dried.

The phosphors prepared as above have, in general, three bands in their emission spectra. The relative intensity of the bands is dependent upon the arsenic concentration in the finished phosphor, the mode of excitation, and the temperature of the phosphor during excitation. A blue band with a peak at 4700 Å. and due to zinc activation of the zinc sulfide appears in all the preparations. An orange band with a peak at 6200 Å. is also evident in all the samples. Relative to the blue band under 3650 Å. excitation, it is most pronounced in the sample containing 0.1 per cent by weight of added arsenic, and its intensity drops off at higher arsenic concentrations. At higher arsenic concentrations a green band with a peak at 5200 Å. becomes evident. In particular, it is very clearly present in the sample containing 2.00 per cent added arsenic.

The characters at room temperature of the phosphors as prepared above are tabulated below:

| Sample | Percent By Weight As Added | 3650 Å. Excitation Relative Energy at— | | | Color Under 3650 Å. Excitation |
|---|---|---|---|---|---|
| | | 4700 Å. | 5200 Å. | 6200 Å. | |
| 1 | 0.01 | 100 | 52 | 68 | Warm White. |
| 2 | 0.10 | 100 | 73 | 200 | Light Orange. |
| 3 | 0.50 | 100 | 61 | 80 | Warm White. |
| 4 | 1.00 | 100 | 67 | 41 | Cold White. |
| 5 | 2.00 | 100 | 103 | 21 | Light Green. |

| Sample | Cathode Ray Excitation 4.7 kv, 5 microamps/Cm.² Relative Energy at— | | | Color Under CR Excitation |
|---|---|---|---|---|
| | 4700Å. | 5200 Å. | 6200 Å. | |
| 1 | 100 | 39 | 11 | Light Blue. |
| 2 | 100 | 42 | 23 | Cold White. |
| 3 | 100 | 47 | 28 | Do. |
| 4 | 100 | 48 | 15 | Do. |
| 5 | 100 | 80 | 9 | Light Green. |

At excitation temperatures above room temperatures, the main effect is to decrease the intensity of the blue band so that the color of the emitted light tends to shift toward the orange.

For television or other purposes where the purest or cold white color is desirable and cathode ray excitation is used, materials having from 0.10 to 1.00 per cent by weight added arsenic are preferred. However, here as well as for ultraviolet excitation, a variety of phosphors ranging from orange or orangish-yellow through white to green may be produced according to my invention by varying the amount of added arsenic, the time of firing, and the temperature of firing either singly or in combination. For example, as pointed out above amounts of arsenic up to and above 5 per cent by weight are added to produce green color emitting phosphors.

While I have described my invention through the medium of particular examples, it is to be understood that I desire and intend to protect by the appended claims all variations therein which do not depart from the spirit and scope of my invention.

What I claim as new and desire to secure by Letters Patent of the United States is:

1. The process of preparing a luminescent material which comprises mixing with zinc sulfide from 0.01 per cent to five per cent by weight of arsenic, from two per cent to six per cent by weight of a flux, firing at 900° C. for one-half hour, cooling, grinding, refiring at 900° C. for fifteen minutes, cooling and washing to free of flux.

2. The process of preparing a luminescent material which comprises mixing with zinc sulfide 0.01% to 5% by weight of arsenic, a flux, and firing at 800° C. to 1200° C.

3. The process of preparing a luminescent material which comprises mixing with zinc sulfide a flux and 0.01% to 5% by weight of arsenic and firing at 900° C. for about one-half hour.

4. The process of preparing a luminescent material which comprises mixing with zinc sulfide a flux and 0.01% to 5% by weight of arsenic, firing at 900° C. for about one-half hour, cooling, grinding, and firing at 900° C. for about fifteen minutes.

5. A luminescent material produced by the process of claim 1.

6. A luminescent material produced by the process of claim 2.

7. A luminescent material produced by the process of claim 3.

8. A luminescent material produced by the process of claim 4.

JEROME S. PRENER.

REFERENCES CITED

The following references are of record in the file of this patent:

UNITED STATES PATENTS

| Number | Name | Date |
|---|---|---|
| 2,074,226 | Kunz | Mar. 16, 1937 |